United States Patent [19]

Bergstein

[11] Patent Number: 5,246,342
[45] Date of Patent: Sep. 21, 1993

[54] WIND ROTOR APPARATUS

[76] Inventor: Frank D. Bergstein, 1201 Edgecliff Pl., Cincinnati, Ohio 45206

[21] Appl. No.: 911,123

[22] Filed: Jul. 9, 1992

[51] Int. Cl.$^5$ .............................................. F03D 3/06
[52] U.S. Cl. ................... 416/197 A; 415/4.4
[58] Field of Search ............ 415/2.1, 3.1, 4.2, 4.4; 416/197 A, 223 R

[56] References Cited

U.S. PATENT DOCUMENTS

| | | |
|---|---|---|
| 246,977 | 9/1881 | Purper . |
| 372,148 | 10/1887 | Henderson ........................ 415/4.2 |
| 377,602 | 2/1888 | Cooper . |
| 543,909 | 8/1895 | Thompson . |
| 591,962 | 10/1897 | Evison . |
| 692,714 | 2/1902 | Sala et al. ........................ 416/197 A |
| 764,571 | 7/1904 | Fisher . |
| 1,200,308 | 10/1916 | Bunnell ........................ 416/197 A |
| 1,217,684 | 2/1917 | Barker . |
| 1,471,095 | 10/1923 | Bonetto . |
| 1,677,745 | 7/1928 | Bonetto ........................ 415/4.2 |
| 1,963,196 | 6/1934 | Frisch . |
| 2,252,788 | 8/1941 | Sparr ........................ 416/197 A |
| 3,267,833 | 8/1966 | Artis et al. ........................ 416/197 A |
| 4,017,204 | 4/1977 | Sellman . |
| 4,355,958 | 10/1982 | Cornick . |
| 4,474,529 | 10/1984 | Kinsey . |
| 4,960,363 | 10/1990 | Bergstein ........................ 415/3.1 |
| 5,088,884 | 2/1992 | Bergstein ........................ 415/3.1 |
| 5,133,637 | 7/1992 | Wadsworth ........................ 415/4.4 |

FOREIGN PATENT DOCUMENTS 396012  7/1933  United Kingdom ........... 416/197 A

Primary Examiner—Edward K. Look
Assistant Examiner—Michael S. Lee
Attorney, Agent, or Firm—Frost & Jacobs

[57] ABSTRACT

A wind rotor is disclosed for turning electrical generators or other mechanical equipment. The wind rotor contains multiple curved blades which are in a single plane of rotation, and which are spaced closely together so as to maximize the efficiency of the captured wind. The open blades are designed to overlap one another to an extent that there are always at least two blades positioned to capture the wind regardless from which direction the wind is blowing. The curved blades allow the rotor to always rotate in the correct direction regardless of the direction of the wind without the use of moving vanes or housings to help direct the wind at certain portions of the wind rotor. If the rotor is made to turn in the incorrect direction, it will, as wind from any direction blows against it, slow down, stop momentarily, and then begin to rotate in the correct direction.

14 Claims, 2 Drawing Sheets

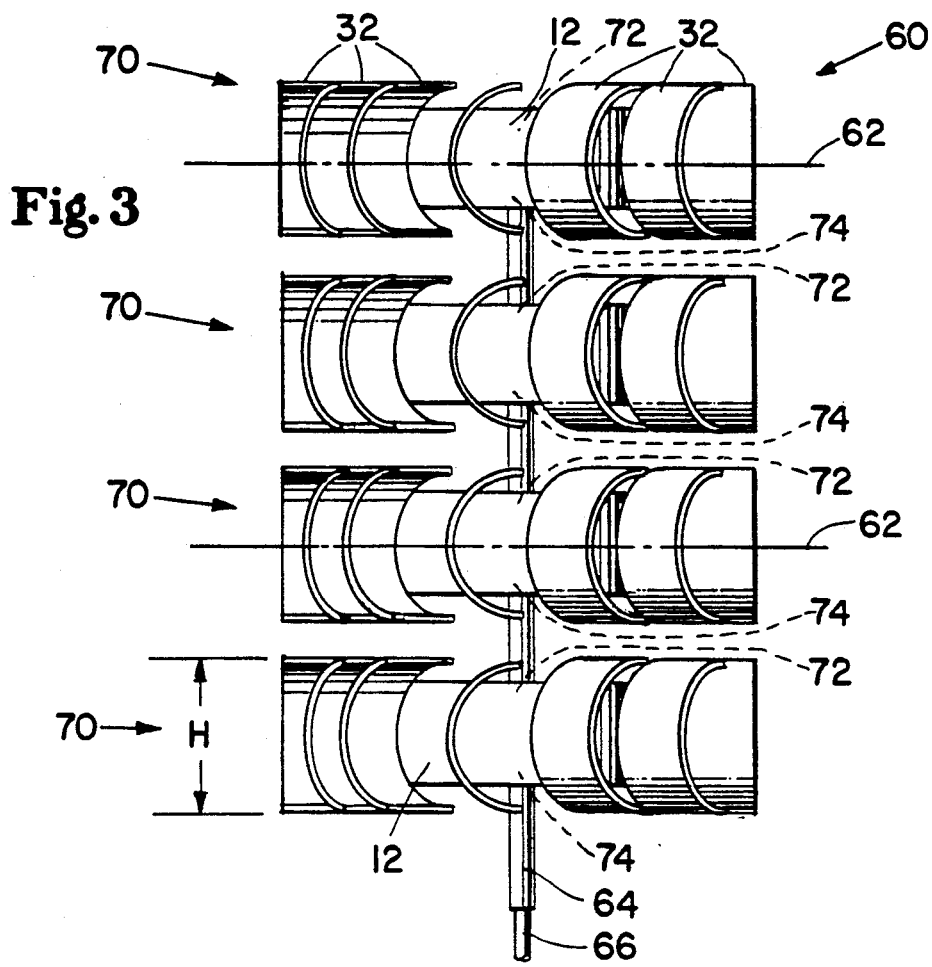
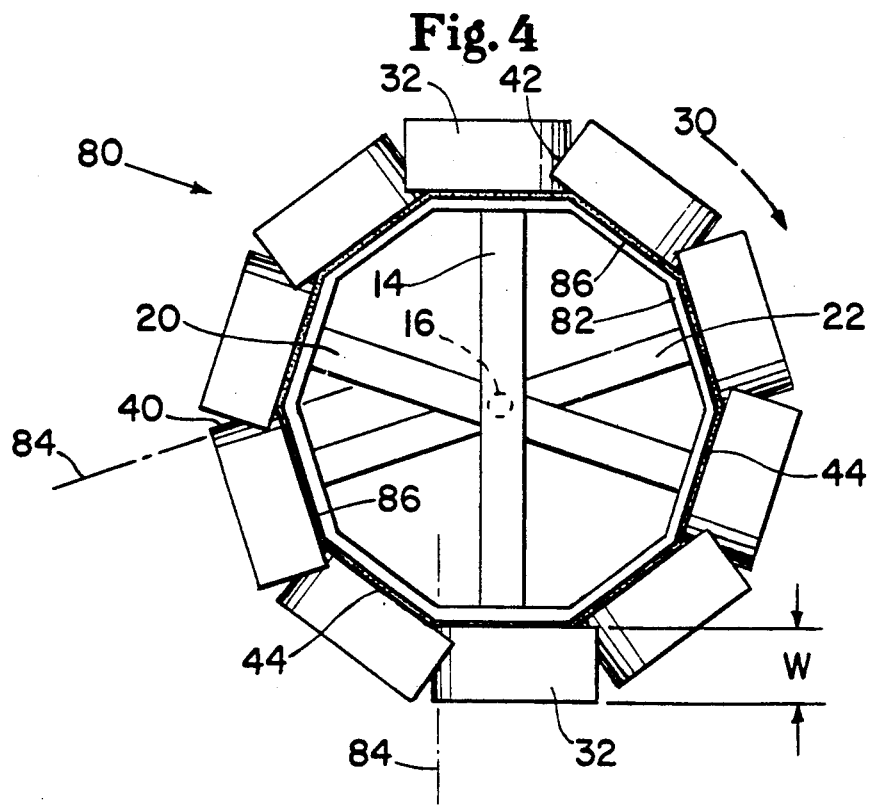

WIND ROTOR APPARATUS

TECHNICAL FIELD

The present invention relates generally to wind rotor equipment and is particularly directed to wind rotors of the type which can be used to drive electrical generators, or other mechanical equipment. The invention will be specifically disclosed in connection with a rotor having multiple curved blades in one plane which are spaced closely together for maximizing the efficiency of the captured wind.

BACKGROUND OF THE INVENTION

Wind rotor machines (or wind mills) are quite old in the art, and have been in use for centuries. Wind rotor machines tend to work at their highest efficiency when the incoming wind is blowing directly onto the movable blades or rotor, such that the direction of the wind is perpendicular to the plane of blade movement as the blades rotate. Another way of describing this characteristic is that the direction of the wind is parallel to the axis of rotation of the blades.

The method for directing the wind onto the blades in the most efficient manner has varied from device to device in the past, and has lead to two basic methods of achieving this desired goal. In the first instance, a housing which surrounds the movable rotor and blades has a set of doors which are opened to allow the wind into the rotor area. One example of this type of windmill with housing is disclosed in Cooper (U.S. Pat. No. 377,602) in which the housing has multiple doors which can be individually opened or closed to let in the wind from the proper direction. The second common method for directing the wind against the blades in a most efficient manner is to provide a windmill that has a relatively large tail (or vane) which automatically directs the blades into the wind. This type of windmill is disclosed in Frisch (U.S. Pat. No. 1,963,196).

The two above methods of efficiently directing wind against the rotor blades are combined in a patent disclosure by Bonetto (U.S. Pat. No. 1,471,095), in which the windmill system has a funnel-shaped housing that can be directed into the wind, by use of a top-mounted vane. This arrangement tends to collect a greater amount of the air in motion and condense it into a smaller cross-sectional area, thereby increasing its velocity at the points where the air passes the blades of the windmill.

Another windmill configuration is disclosed in Fisher (U.S. Pat. No. 764,571), in which a wind motor includes a main wind-wheel and an auxiliary wind-wheel. The apparatus is designed to be movable, either automatically or otherwise, so that the wind-wheels always face squarely into the wind. In addition, an inclined deflector is provided to direct the wind onto the blades. The blades themselves have an overall scoop shape with open ends. The open end near the shaft permits the passage of wind from one blade to the next succeeding blade, which tends to the make the Fisher apparatus less efficient. Its relatively high complexity also tends to make it less reliable.

Many of the wind rotor machines presently available require some type of movable device to insure that the blades are positioned to most efficiently collect the wind as it arrives from various directions. The moving parts required for performing this function are a possible cause for maintenance problems and down-time. Some of the presently known wind rotor machines also have housings which are themselves either movable, or have movable doors or openings which tend to direct wind into the rotor and blade areas of the wind rotor apparatus. Such movable parts, again, can be a cause for maintenance problems and down-time, and in addition cause the overall apparatus to be somewhat complex. Presently known wind rotor devices become relatively useless if their movable parts fail to adequately perform to direct the wind, or to move the overall rotor and blades, so that the wind strikes the blades in an efficient manner.

SUMMARY OF THE INVENTION

Accordingly, it is a primary object of the present invention to provide a wind rotor device which efficiently operates regardless of the direction of the wind without need for any extraneous moving parts or air-funneling devices to improve its overall efficiency of operation.

It is another object of the present invention to provide a wind rotor device which, if spinning in the incorrect direction for whatever reason, will, as wind strikes the blades of the apparatus, slow down and stop, then start to turn in the correct direction of rotation.

It is a further object of the present invention to provide a wind rotor device which contains multiple blades in a single plane of rotation which are closely spaced together without the blades interfering with one another, both mechanically and from a fluid flow standpoint.

It is yet another object of the present invention to provide a wind rotor device which has a relatively small diameter as compared to the over all height of the rotating hub and blades.

To achieve the foregoing and other objects, and in accordance with the purposes of the present invention as described herein, an improved wind rotor device is provided having a cylindrically-shaped hub, which is supported by a vertical shaft, and having several closely spaced blades which are attached to the outer portions of the rotating hub. At least two cross-members are provided within the interior space of the hub, such cross-members having bearing surfaces by means of which they are attached to a vertical shaft. The vertical shaft is stationary and the cross-members and hub rotate about the shaft as one overall member. The multiple blades on the exterior surfaces of the hub are curved such that the longitudinal axis of each blade is perpendicular to the axis of rotation (i.e., the vertical shaft). Each of the curved blades is attached to the outer surface of the rotating hub at the apex of curvature of the blade, which is located near the trailing portion of each of the blades. The leading edges of each of the curved blades can overlap the trailing portions of the next adjacent upwind blade, in a manner so that the blades can be spaced very closely together, thereby leading to high efficiency of energy transfer from moving air to rotational energy of the wind rotor device.

In a modified wind rotor assembly, more than one of the above wind rotor devices is mounted upon a common vertical shaft, which rotates with the wind rotor devices. Each of the wind rotor devices can be constructed of curved blades which are of the same size, or curved blades of varying sizes, as efficiency and safety requirements allow for a given installation. Curved blades which are rather tall in vertical height can be used without increasing the overall diameter of the wind rotor apparatus to a significant extent, by using blades having a different profile, i.e., increasing their height without substantially increasing their width. The number of layers of rotating hub and curved blade assemblies can be increased to achieve the overall power and torque required for a particular application. The only major constraint is the overall maximum height to be allowed at a particular installation.

In a further modification of the wind rotor assembly, the rotor is nearly cylindrical in shape, having, however, multiple facets along its outer diameter such that a larger portion of each of the curved blades can be rigidly attached to each of the facets of the rotor. The shape of each of individual curved blade would not change as compared to cylindrical rotors, however, the shape of the rotor, as viewed from above, would be that of a decagon or dodecagon for a rotor-blade assembly having either ten blades or 12 blades, respectively.

Still other objects of the present invention will become apparent to those skilled in this art from the following description wherein there is shown and described a preferred embodiment of this invention, simply by way of illustration, of one of the best modes contemplated for carrying out the invention. The objects and advantages of the invention may be realized and obtained by means of the instrumentalities and combinations particularly pointed out in the appended claims. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is an elevational view of a multi-layer wind rotor assembly having four sub-assemblies, each of which are similar to the wind rotor apparatus of FIG. 1, and all mounted upon a common rotating vertical shaft.

FIG. 4 is a plan view of a wind rotor apparatus having a faceted hub, constructed in accordance with the principles of the present invention.

DETAILED DESCRIPTION OF THE PREFERRED EMBODIMENT

Reference will now be made in detail to the present invention, examples of which are illustrated in the accompanying drawings, wherein like numerals indicate the same elements throughout the views.

Figure 1:
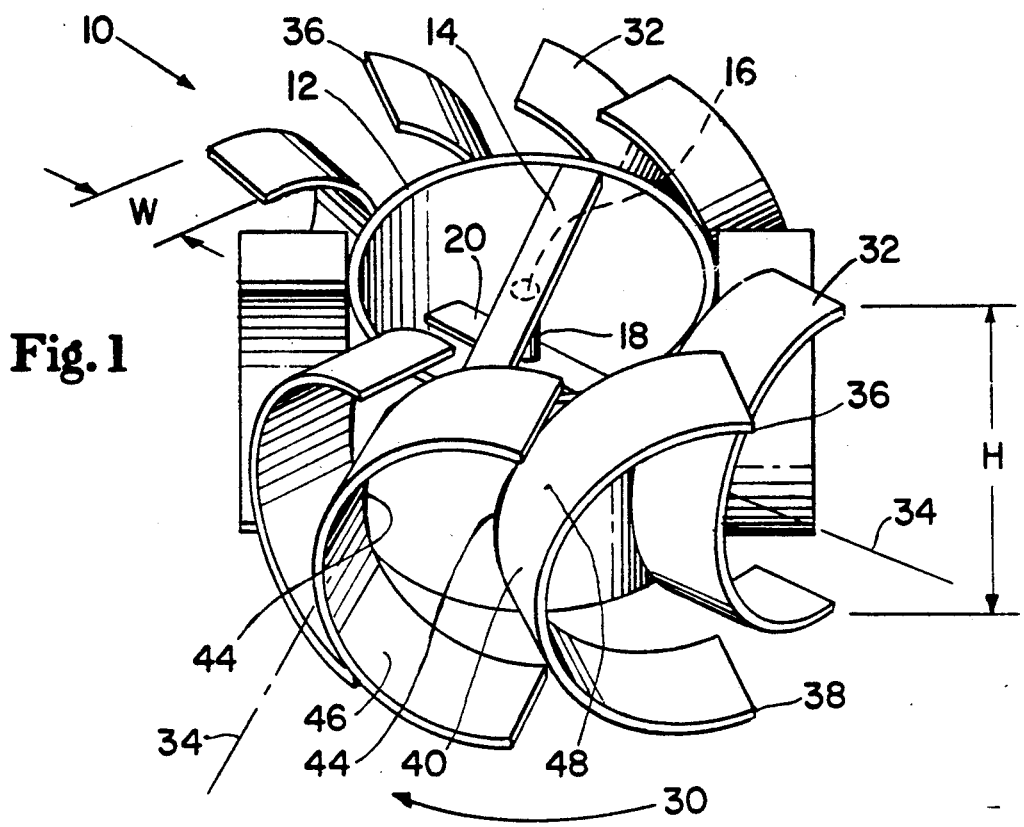
FIG. 1 is a perspective view of a wind rotor apparatus having a cylindrical hub, constructed in accordance with the principles of the present invention.
Figure 2:
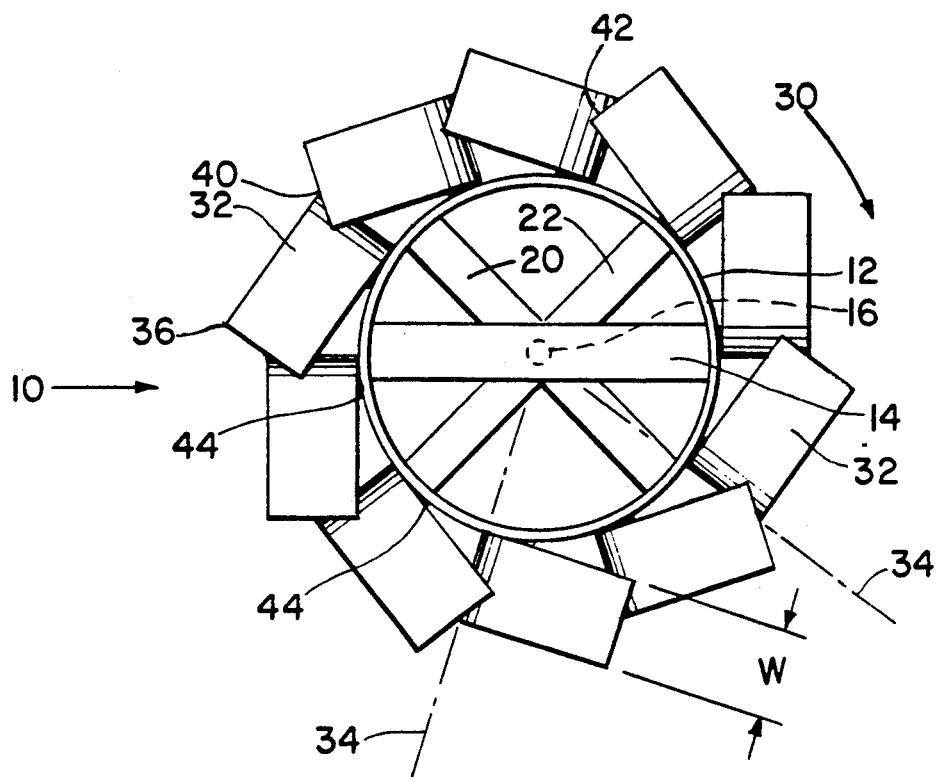
FIG. 2 is a plan view of the wind rotor apparatus of FIG. 1.

Referring now to the drawings, FIGS. 1 and 2 shows a wind rotor assembly generally designated by the numeral 10, having a cylindrical central hub 12, cross-members 14, 20 and 22, and a plurality of curved blades 32. The entire wind rotor assembly 10 is rotatably attached to a vertical shaft 18. The middle cross-member 20 and bottom cross-member 22 have holes at their center through which vertical shaft 18 extends. Such holes are sized to provide bearing surfaces between cross-members 20 and 22 and the vertical shaft 18.

Top cross-member 14 does not have a hole at its center, but instead has a bearing surface at the location designated by the numeral 16 which rides along the top of vertical shaft 18. The tip of vertical shaft 18 (at location 16) is preferably made of a self-lubricating plastic material, which bears against the bottom surface of top cross-member 14. This bottom surface consists preferably of metallic material, such as brass, to prevent wear. This type of vertical shaft mounting configuration is known in the art, and is disclosed in U.S. Pat. Nos. 4,960,363 and 5,088,884, both by Bergstein. It will be understood that a U-frame or other method of mounting could be used to hold rotor assembly 10 vertically in place, rather than the use of a vertical shaft 18.

The entire wind rotor assembly 10 turns as one unit in the direction of rotation designated by the arrow 30. The bearing surfaces of cross-members 14, 20 and 22 allow the wind rotor assembly 10 to rotate while the vertical shaft 18 remains stationary.

In the illustrated embodiment of wind rotor assembly 10, each of the curved blades 32 has a semi-circular shape, as viewed from the horizontal. Each of the blades 32 has an upper leading edge 36, a lower leading edge 38, and an apex of curvature, designated by the numeral 40. Whereas the apex 40 is the leading portion of each blade 32 as blade 32 rotates about vertical shaft 18, the air flow of the wind will always first intersect the upper and lower edges 36 and 38, respectively, of a given blade 32 as that blade 32 faces into the direction of the wind. Therefore, edges 36 and 38 have been designated as "leading-edges." The longitudinal axis at the apex 40 of each blade 32 is indicated by the broken line 34. Each of the longitudinal axes 34 at the apexes 40 of the blades 32 is perpendicular to the axis of rotation, which is located along the center line of vertical shaft 18. Curved blades 32 are spaced closely enough to one another such that their leading edges 36 and 38 overlap the apexes of curvature 40 of the next adjacent upwind blades 32, which is best viewed in FIG. 2 at the location designated by the numeral 42.

Blades 32 may be attached to central hub 12 by any known method, only being dependent upon the size of the blades and the materials used for the blades and central hub. The illustrated method of attaching blades 32 to central hub 12 is by use of an adhesive material, which is applied at the locations designated by the numeral 44 and other similar locations in the wind rotor assembly 10.

The wind rotor assembly 10 illustrated in FIG. 2 provides a total of ten blades 32. With such a configuration, at least two blades 32 are always facing into the direction of the wind regardless from which direction the wind is blowing. A minimum of two blades always facing into the direction of the wind is preferred, so that wind rotor assembly 10 will always rotate in the correct direction of rotation 30 in the event of a wind speed sufficient to turn the blades 32. The shape of each of the blades 32 is such that it efficiently captures the wind blowing against its open side, (which is designated by the numeral 46), and is very inefficient at capturing the wind that blows against its closed side, (which is designated by the numeral 48). This disparity of efficiencies in capturing the wind (and, correspondingly, producing mechanical movement) is what allows wind rotor assembly 10 to effectively produce the proper direction of rotation 30 regardless of the incoming wind direction.

By temporarily capturing wind on the open side 46 of blade 32, the air pressure thereby created at open side 46 will be greater than the air pressure created at the closed side 48, thus producing mechanical movement of blade 32 in the direction from open side 46 towards closed side 48.

The overall height of each blade 32, from its upper leading edge 36 to its lower leading edge 38 is shown in FIG. 1 by the letter "H". The width of each blade 32 is shown (in FIGS. 1 and 2) by the letter "W". The ratio of the height "H" of blade 32 to the width "W" is preferably in the range of 1:1 to 2:1.

FIG. 3 depicts a multi-layer wind rotor assembly, designated by the numeral 60. Each "layer" is a separate wind rotor assembly, generally indicated by the numeral 70, and comprises a multiple set of blades 32, a top coupling 72, and a bottom coupling 74. Vertical shaft 64 extends through the top and bottom couplings 72 and 74, respectively, of all the layers of wind rotor assemblies 70. Vertical shaft 64 is affixed to each of the wind rotor assemblies 70 via the top and bottom couplings 72 and 74, and rotates in unison with those wind rotor assemblies. A fixed vertical shaft 66 is mounted within the hollow space of rotatable shaft 64, thereby providing a bearing surface around which rotatable shaft 64 rotates. The top portion (not shown) of fixed vertical shaft 66 is tapered, and abuts a bearing pad (not shown) which is affixed to the top, inner horizontal surface of rotatable shaft 64. This type of vertical shaft mounting configuration is known in the art, and is disclosed in U.S. Pat. Nos. 4,960,363 and 5,088,884, both by Bergstein.

Each of the wind rotor assemblies 70 has a plane of rotational movement, designated by dashed lines 62, for each of their respective sets of blades 32. As related above, the leading edges 36 and 38 of each of blades 32 can overlap the apex of curvature 40 of the next adjacent upwind blades in each layer of wind rotor assembly 70, thereby allowing for a high density of blades 32 within a single plane of rotation 62. In addition, the number of layers of wind rotor assemblies 70 is constrained only by mechanical strength requirements and physical size limitations for a particular installation.

The profile of each of the blades 32 is determined by the ratio of the blade's height "H" and the blade's width "W". In the illustrated embodiment of FIG. 3, this profile is equal for each of the layers of wind rotor assemblies 70. This need not be the case, and the profile for each individual layer of wind rotor assembly 70 can have a different profile ratio as desired, depending upon the physical size limitations and wind velocity characteristics of a given installation. Again, as related above, the upper layers of wind rotor assemblies 70 can have blades 32 with much larger heights (dimension "H"). On the other hand, if space allows, the upper layers can also have much larger widths (dimension "W"), which would call for an increase in the overall diameter of multi-layer wind rotor assembly 60, constrained only by physical size limitations of a particular installation.

An alternative shape for the central hub is illustrated in FIG. 4. Rather than having a circular cross-section, as in the central hub 12 of the wind rotor assembly 10, FIG. 4 depicts a wind rotor assembly 80 which uses a central hub 82 having a decagonal shape. Each of the "sides" of the decagon is a facet 86 exhibiting a flat surface. Blades 32 may be attached to each facet 86 of central hub 82 by any known method, only being dependent upon the size of the blades and the materials used for the blades and central hub. As can be seen in FIG. 4, the major portion of the inner edge of each blade 32 can abut the facet 86, thereby allowing for an attachment means having greater mechanical strength.

The illustrated method of attaching blades 32 to each facet 86 is by use of an adhesive material, which is applied at the locations designated by the numeral 44 and other similar locations in the wind rotor assembly 80. In this configuration, a greater proportion of each blade 32 can be adhesively attached to the central hub 82 as compared to the proportion of each blade 32 which is attached to central hub 12 (as best seen in FIG. 2), thereby providing greater mechanical strength.

The longitudinal axis 84, at the apex of curvature 40 of each blade 32, of central hub 82 is somewhat offset from the centerline of central hub 82 (as can be viewed in FIG. 4). This is in comparison to the longitudinal axes 34 of the blades 32 of central hub 12 (as viewed in FIG. 2), which intersect the centerline of central hub 12. This difference in construction does not affect the efficiency of operation of wind rotor assembly 80 as compared to that of wind rotor assembly 10.

The other details of construction of wind rotor assembly 80 are similar to wind rotor assembly 10, including the use of cross-members 14, 20, and 22, and having a bearing surface 16 at the upper tip of vertical shaft 18. At least two blades 32 are always facing into the wind, regardless of the wind's direction, and the preferred ratio of blade height "H" to blade width "W" is in the range of 1:1 to 2:1. The blades 32 are closely spaced, and overlap adjacent upwind blades at locations designated by the numeral 42, creating a high density of blades within one plane of rotation.

The wind rotor assembly 80 will always rotate in the correct direction of rotation 30 regardless of the direction of the incoming wind, in the event of a wind speed sufficient to turn the blades 32. This occurs since the blades 32 are of a curved shape to efficiently capture the wind on their open sides, but not on their closed sides. By temporarily capturing wind on the open side of blade 32, the air pressure thereby created at that open side will be greater than the air pressure created at the closed side, thus producing mechanical movement of blade 32.

If desired, a wind rotor assembly having a faceted central hub could be constructed with more than ten facets and blades. For example, the central hub could have the shape of a twelve-sided dodecagon (not shown), having a corresponding twelve blades 32. Using such construction, the wind rotor assembly would have three blades always facing into the incoming wind, and would always rotate in the correct direction of rotation due to the curved shape of the blades 32.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A wind rotor, comprising:

(a) a central hub, said central hub having a vertical axis of rotation and having a substantially vertical outer surface;

(b) means for mounting said central hub for rotation about said vertical axis of rotation;

(c) a plurality of curved blades, each of said blades having an upper leading edge and a lower leading edge, each said blade having an apex of curvature, each said blade having an axial longitudinal axis which is perpendicular to said axis of rotation, wherein the plurality of axial longitudinal axes of said blades forms a plane of rotational movement; and (d) each of said blades further having first and second curved side edges, each said blade having a substantially uniform width between said first and second curved side edges in the direction of said axial longitudinal axis, and each said blade being rigidly attached to the substantially vertical outer surface of said hub along said first curved side edge thereby preventing air spillover proximal to said hub from each said blade to its adjacent downwind blade.

2. A wind rotor as recited in claim 1, wherein said central hub has the shape of a polygon in which the outer surface of said hub is faceted, and each of said blades is rigidly attached to said hub at one of its facets along a major portion of the side of the blade nearest to the axis of rotation of the wind rotor.

3. A wind rotor as recited in claim 2, wherein the polygon shape of said central hub is a decagon having ten facets, and a blade is rigidly attached to said hub at each one of its ten facets along a major portion of the side of the blade nearest to the axis of rotation of the wind rotor.

4. A wind rotor as recited in claim 1, wherein each blade of said plurality of curved blades has an adjacent upwind blade and an adjacent downwind blade, and wherein each blade of said plurality of curved blades is so closely spaced to its adjacent blades that the upper and lower leading edges of each blade overlap the apex of curvature of each adjacent upwind blade.

5. A wind rotor as recited in claim 1, wherein each blade of said plurality of curved blades is so closely spaced to its adjacent blades such that there are always at least two blades facing into the direction of the wind regardless from which direction the wind is blowing.

6. A wind rotor as recited in claim 1, wherein said blades are attached to said central hub at said apex of curvature of the blade along the blade's first curved side edge.

7. A wind rotor, comprising:

(a) a vertical shaft;

(b) a central hub which is rotatably attached to said vertical shaft at one or more bearing surfaces, said central hub having an axis of rotation along the centerline of said vertical shaft, said central hub having a substantially vertical outer surface; and (c) a plurality of curved blades, each of said blades having an upper leading edge and a lower leading edge, each said blade having an apex of curvature, each said blade having an axial longitudinal axis which is perpendicular to said axis of rotation, wherein the plurality of axial longitudinal axes of said blades forms a plane of rotational movement; and (d) each of said blades further having first and second curved side edges, each said blade having a substantially uniform width between said first and second curved side edges in the direction of said axial longitudinal axis, and each said blade being rigidly attached to the substantially vertical outer surface of said hub along said first curved side edge thereby preventing air spillover proximal to said hub from each said blade to its adjacent downwind blade.

8. A wind rotor as recited in claim 7, wherein said blades are attached to said central hub at said apex of curvature of the blade along the blade's first curved side edge.

9. A wind rotor, comprising:

(a) a rotatable vertical shaft;

(b) a plurality of rotor subassemblies, each comprising:

(i) a central hub which is fixedly attached to said vertical shaft at one or more bearing surfaces, said central hub having an axis of rotation along the centerline of said vertical shaft, and said central hub having a substantially vertical outer surface;

(ii) a plurality of curved blades, each of said blades having an upper leading edge and a lower leading edge, each said blade having an apex of curvature, each said blade having an axial longitudinal axis which is perpendicular to said axis of rotation, wherein the plurality of axial longitudinal axes of said blades forms a plane of rotational movement;

(iii) each of said blades further having first and second curved edges, each said blade having a substantially uniform width between said first and second curved side edges in the direction of said axial longitudinal axis, and each said blade being rigidly attached to the substantially vertical outer surface of said hub along said first curved side edge thereby preventing air spillover proximal to said hub from each said blade to its adjacent downwind blade;

(c) wherein each of said plurality of rotor subassemblies is fixedly attached to said vertical shaft at different vertical positions along the shaft, such that each rotor subassembly can capture moving air without substantially interfering with the moving air being captured by adjacent rotor subassemblies; and (d) wherein the blades of each of said plurality of rotor subassemblies are curved in the same direction.

10. A wind rotor as recited in claim 9, wherein each blade of said plurality of curved blades has an adjacent upwind blade and an adjacent downwind blade, and wherein each blade of said plurality of curved blades is so closely spaced to its adjacent blades, on each of the plurality of rotor subassemblies, that the upper and lower leading edges of each blade overlap the apex of curvature of each adjacent upwind blade.

11. A wind rotor as recited in claim 9, wherein each blade of said plurality of curved blades is so closely spaced to its adjacent lades, on each of the plurality of rotor subassemblies, such that there are always at least two blades facing into the direction of the wind regardless from which direction the wind is blowing.

12. A method for converting the movement of air into rotational mechanical movement, comprising the steps of:

(a) providing a rotatable central hub which is mounted upon a vertical shaft, said hub having an axis of rotation along the centerline of said vertical shaft, said hub having a substantially vertical outer surface;

(b) providing a plurality of curved blades, each of said blades having an open side and a closed side, each said blade having an apex of curvature, each said blade having an axial longitudinal axis which is perpendicular to said axis of rotation, wherein the plurality of said blades forms a plane of rotational movement, each said blade further having first and second curved side edges, each said blade having a substantially uniform width between said first and second curved side edges in the direction of said axial longitudinal axis, and each said blade being rigidly attached to the substantially vertical outer surface of said hub along said first curved side edge thereby preventing air spillover proximal to said hub from each blade to its adjacent downwind blade; and (c) temporarily capturing moving air against each of said plurality of curved blades, wherein the shape of each of said plurality of curved blades captures moving air more efficiently on the open side of the blade than on the closed side of the blade, thereby providing said rotational mechanical movement in the direction of rotation from the open side of each blade toward its closed side regardless of the direction of the incoming moving air.

13. A method for converting the movement of air into rotational mechanical movement, comprising the steps of:

(a) providing a rotatable central hub which is mounted upon a vertical shaft, said hub having an axis of rotation along the centerline of said vertical shaft and having a substantially vertical outer surface;

(b) providing a plurality of curved blades, each of said blades having an open side and a closed, each said blade having an apex of curvature, each said blade having an axial longitudinal axis which is perpendicular to said axis of rotation, wherein the plurality of said blades forms a plane of rotational movement, each said blade further having first and second curved side edges, each said blade having a substantially uniform width between said first and second curved side edges in the direction of said axial longitudinal axis, and each said blade being rigidly attached to the substantially vertical outer surface of said hub along said first curved side edge thereby preventing air spillover proximal to said hub from each blade to its adjacent downwind blade; and (c) temporarily capturing moving air against the open side of each of said plurality of curved blades such that said captured moving air tends to force said curved blades to move in the direction of rotation from the open side of each blade toward its closed side.

14. A method for converting the movement of air into rotational mechanical movement as recited in claim 13, including the step of providing each of said plurality of curved blades with a shape which allows moving air to be captured at a greater pressure on the open side of the blade than on the closed side of the blade.

* * * * *

UNITED STATES PATENT AND TRADEMARK OFFICE
CERTIFICATE OF CORRECTION

PATENT NO. : 5,246,342
DATED     : September 21, 1993
INVENTOR(S) : Frank D. Bergstein It is certified that error appears in the above—identified patent and that said Letters Patent is hereby corrected as shown below:

Column 8, line 32, (claim 9) "side" should be inserted after --curved--

Column 8, line 62, (claim 11) "lades" should read --blades--

Column 10, line 7, (claim 13) "side" should be inserted after --closed--

Signed and Sealed this

Nineteenth Day of April, 1994

Attest:

BRUCE LEHMAN

Attesting Officer        Commissioner of Patents and Trademarks